US012088789B2

(12) United States Patent
Iwamura et al.

(10) Patent No.: US 12,088,789 B2
(45) Date of Patent: Sep. 10, 2024

(54) INTRA PREDICTION DEVICE, IMAGE ENCODING DEVICE, IMAGE DECODING DEVICE AND PROGRAM

(71) Applicant: NIPPON HOSO KYOKAI, Tokyo (JP)

(72) Inventors: Shunsuke Iwamura, Tokyo (JP); Atsuro Ichigaya, Tokyo (JP); Shimpei Nemoto, Tokyo (JP)

(73) Assignee: NIPPON HOSO KYOKAI, Tokyo (JP)

( * ) Notice: Subject to any disclaimer, the term of this patent is extended or adjusted under 35 U.S.C. 154(b) by 127 days.

(21) Appl. No.: 17/749,446

(22) Filed: May 20, 2022

(65) Prior Publication Data

US 2022/0279170 A1   Sep. 1, 2022

Related U.S. Application Data

(63) Continuation of application No. PCT/JP2020/041100, filed on Nov. 2, 2020.

(30) Foreign Application Priority Data

Nov. 21, 2019   (JP) .................................. 2019-210881

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/186* (2014.11)

(58) Field of Classification Search
CPC ............... H04N 19/105; H04N 19/157; H04N 19/159; H04N 19/176; H04N 19/186; H04N 19/593
(Continued)

(56) References Cited

U.S. PATENT DOCUMENTS

2016/0119631 A1\* 4/2016 Kawamura .......... H04N 19/196
                                                                375/240.12
2020/0288135 A1\* 9/2020 Laroche ............... H04N 19/105
(Continued)

FOREIGN PATENT DOCUMENTS

WO      2015/005418 A1     1/2015
WO      2019/221465 A1    11/2019
WO   WO-2020149616 A1 *   7/2020

OTHER PUBLICATIONS

International Search Report issued in PCT/JP2020/041100; mailed Jan. 19, 2021.
(Continued)

*Primary Examiner* — Kathleen M Walsh
(74) *Attorney, Agent, or Firm* — Studebaker & Brackett PC

(57) ABSTRACT

An intra prediction device predicts, by intra prediction, a luminance block and a chrominance block obtained by dividing an image. The intra prediction device includes a cross-component linear model predictor configured to predict the chrominance block from a decoded luminance block at a position corresponding to a position of the chrominance block using a linear model calculated from respective luminance and chrominance reference pixels around the chrominance block. The cross-component linear model predictor includes a reference pixel position selector configured to select linear model calculation pixel positions that are positions of the reference pixels to be used to calculate the linear model based on a luminance intra prediction mode that is an intra prediction mode applied to the intra prediction of the decoded luminance block.

9 Claims, 7 Drawing Sheets

(51) Int. Cl.
*H04N 19/176* (2014.01)
*H04N 19/186* (2014.01)

(58) Field of Classification Search
USPC .................................................. 375/240.02
See application file for complete search history.

(56) References Cited

U.S. PATENT DOCUMENTS

| | | | | |
|---|---|---|---|---|
| 2021/0243457 | A1* | 8/2021 | Ahn | H04N 19/593 |
| 2021/0297656 | A1* | 9/2021 | Ma | H04N 19/593 |
| 2021/0385469 | A1* | 12/2021 | Deng | H04N 19/96 |
| 2021/0385499 | A1* | 12/2021 | Zhang | H04N 19/70 |
| 2022/0030257 | A1* | 1/2022 | Deng | H04N 19/186 |
| 2022/0038683 | A1* | 2/2022 | Choi | H04N 19/159 |
| 2022/0078453 | A1* | 3/2022 | Tamse | H04N 19/105 |
| 2022/0109885 | A1* | 4/2022 | Deng | H04N 19/105 |
| 2022/0124340 | A1* | 4/2022 | Deng | H04N 19/105 |
| 2022/0279169 | A1* | 9/2022 | Deng | H04N 19/176 |
| 2023/0308691 | A1* | 9/2023 | Deng | H04N 19/186 348/420.1 |

OTHER PUBLICATIONS

Benjamin Bross et al. "Versatile Video Coding (Draft 5)" Joint Video Experts Team (JVET) of ITU-T SG 16 WP 3 and ISO/IEC JTC 1/SC 29/WG 11, 14th Meeting; JVET-N1001-v1; Mar. 19-27, 2019; pp. 1-343; Geneva, Switzerland.

Kei Kawamura et al. "Non-RCE1: Chroma intra prediction with mode-dependent reduced reference" Joint Collaborative Team on Video Coding (JCT-VC) of ITU-T SG 16 WP 3 and ISO/IEC JTC 1/SC 29/WG 11, 14th Meeting; JCTVC-N0368_r1; Jul. 25 - Aug. 2, 2013; pp. 1-6; Vienna, Austria.

Xiang Ma et al. "CE3: CCLM/MDLM using simplified coefficients derivation method (Test 5.6.1, 5.6.2 and 5.6.3)" Joint Video Experts Team (JVET) of ITU-T SG 16 WP 3 and ISO/IEC JTC 1/SC 29/WG 11, 12th Meeting; JVET-L0340_r1; Oct. 3-12, 2018; pp. 1-7; Macao, China.

* cited by examiner

FIG. 3A LT_CCLM
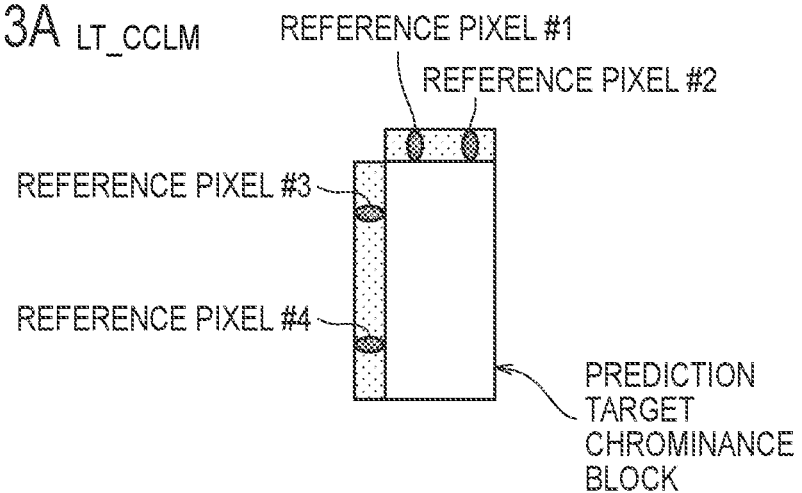
FIG. 3B T_CCLM
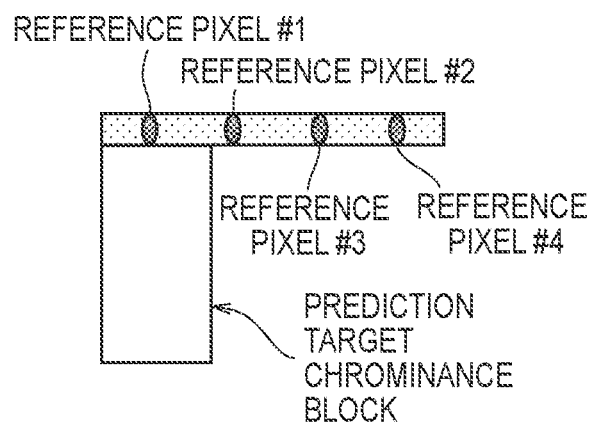
FIG. 3C L_CCLM
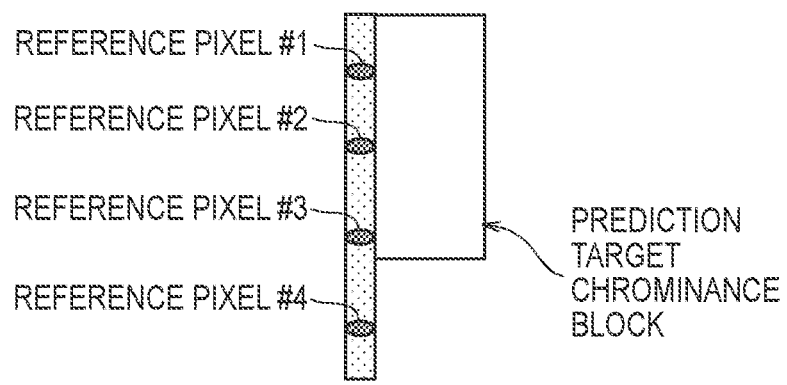

INTRA PREDICTION DEVICE, IMAGE ENCODING DEVICE, IMAGE DECODING DEVICE AND PROGRAM

RELATED APPLICATIONS

The present application is a continuation based on PCT Application No. PCT/JP2020/041100, filed on Nov. 2, 2020, which claims the benefit of Japanese Patent Application No. 2019-210881 filed on Nov. 21, 2019. The content of which is incorporated by reference herein in their entirety.

TECHNICAL FIELD

The present invention relates to an intra prediction device, an image encoding device, an image decoding device and a program.

BACKGROUND ART

Conventionally, a video encoding system has been studied in order to compress a data amount of still images and moving images at the time of transmission and preservation. In recent years, ultra-high-resolution video technologies, including 8K-SHV as a typical example, have been becoming commonly used in the video encoding technology. The AVC/H.264 and HEVC/H.265 encoding schemes are known as techniques for transmitting a vast amount of video data.

MPEG, jointly established by ISO (International Organization for Standardization) and IEC (International Electrotechnical Commission), and VVC (Versatile Video Coding), which is a next generation encoding scheme jointly standardized by ITU (International Telecommunication Union), use intra prediction utilizing intra-frame spatial correlation. In the intra prediction, decoded reference pixels around an intra prediction target block are utilized, and an image encoding device selects an optimum intra prediction mode from the intra prediction modes that are planar prediction, DC prediction and a plurality of ways of directional prediction and transmits information indicating the selected intra prediction mode to an image decoding device.

Generally, for luminance components and chrominance components configuring images, it is known that spatial features are similar. Under such a presupposition, cross-component linear model prediction (CCLM) for predicting a chrominance block has been introduced to the VVC (see Non Patent Literature 1).

The CCLM is to predict the chrominance block from a decoded luminance block at a position corresponding to the position of the chrominance block using a linear model calculated from luminance and chrominance reference pixels present around the chrominance block.

When applying the CCLM to the chrominance block, one of three CCLM modes in which the positions of the luminance and chrominance reference pixels to be used to calculate the linear model are different is selectable, and the image encoding device transmits CCLM mode information indicating which CCLM mode of the three CCLM modes is selected to the image decoding device side.

CITATION LIST

Non Patent Literature

Non-Patent Literature 1: JVET-N1001 Versatile Video Coding (Draft 5)

DISCLOSURE OF INVENTION

However, when applying the CCLM, even though prediction accuracy for the chrominance block can be improved, since the CCLM mode information needs to be transmitted from the image encoding device to the image decoding device side for each chrominance block, additional information to be transmitted increases and encoding efficiency may be lowered.

Accordingly, an object of the present invention is to provide an intra prediction device, an image encoding device, an image decoding device and a program capable of suppressing increase of additional information to be transmitted even when applying CCLM.

An intra prediction device according to a first feature predicts, by intra prediction, a luminance block and a chrominance block obtained by dividing an image. The intra prediction device includes a cross-component linear model predictor configured to predict the chrominance block from a decoded luminance block at a position corresponding to a position of the chrominance block using a linear model calculated from respective luminance and chrominance reference pixels around the chrominance block. The cross-component linear model predictor controls calculation of the linear model based on a luminance intra prediction mode that is an intra prediction mode applied to the intra prediction of the decoded luminance block.

An image encoding device according to a second feature includes the intra prediction device according to the first feature.

An image decoding device according to a third feature including the intra prediction device according to the first feature.

A program according to a fourth feature for causing a computer to function as the intra prediction device according to the first feature.

The present invention makes it possible to provide an intra prediction device, an image encoding device, an image decoding device and a program capable of suppressing increase of additional information to be transmitted even when applying CCLM.

BRIEF DESCRIPTION OF DRAWINGS

FIGS. 3A to 3C are diagrams illustrating three CCLM modes relating to the embodiment.

DESCRIPTION OF EMBODIMENTS

An image encoding device and an image decoding device according to a present embodiment of the invention are described with reference to the accompanying drawings. The image encoding device and the image decoding device according to the present embodiment encode and decode videos such as MPEG videos. In the description of the drawings below, the same or similar reference signs are used for the same or similar parts.

<Configuration of Image Encoding Device>

Figure 1:
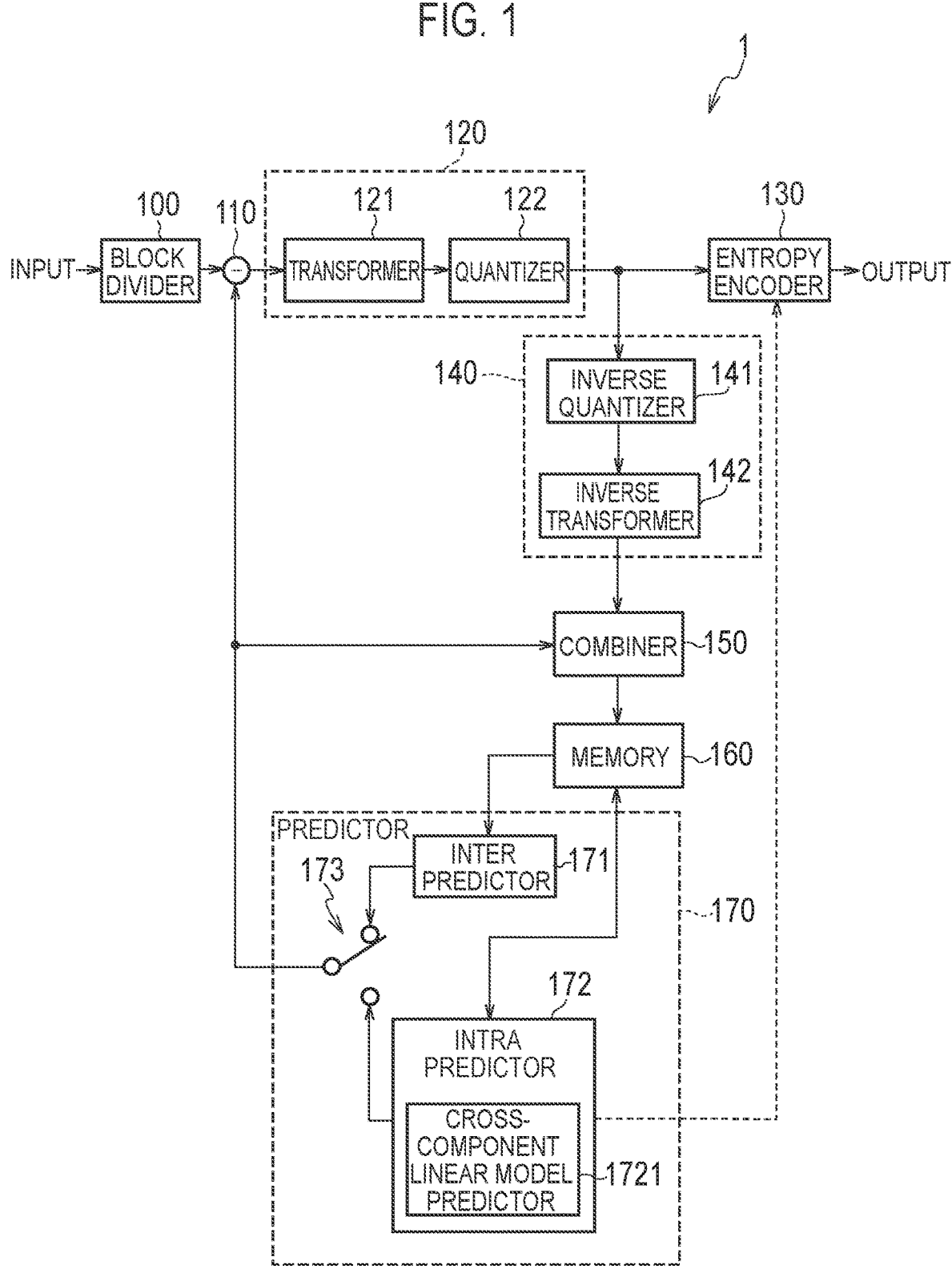
FIG. 1 is a diagram illustrating a configuration of an image encoding device according to an embodiment.

First, the configuration of the image encoding device relating to the present embodiment will be described. FIG. 1 is a diagram illustrating the configuration of an image encoding device 1 relating to the present embodiment.

As illustrated in FIG. 1, the image encoding device 1 includes a block divider 100, a subtractor 110, a transformer/quantizer 120, an entropy encoder 130, an inverse quantizer/inverse transformer 140, a combiner 150, a memory 160, and a predictor 170.

The block divider 100 divides an original image that is an input image in of a frame (or picture) that constitutes a moving image into a plurality of image blocks and outputs the image blocks obtained through division to the subtractor 110. A size of the image block is, for example, 32×32 pixels, 16×16 pixels, 8×8 pixels, 4×4 pixels, or the like. A shape of the image block is not limited to square and may be rectangular (non-square). The image block is a unit in which the image encoding device 1 performs encoding (that is, an encoding target block), and is a unit in which the image decoding device performs decoding (that is, a decoding target block). Such an image block is sometimes referred to as a CU (Coding Unit).

The input image is constituted by luminance signals (Y) and chrominance signals ($C_b$, $C_r$), and each pixel within the input image is configured by luminance components (Y) and chrominance components ($C_b$, $C_r$). The image encoding device 1 corresponds to three chrominance formats (chroma formats) of 4:4:4, 4:2:2 and 4:2:0 for example. The block divider 100 outputs a luminance block by performing block division to the luminance signals, and outputs a chrominance block by performing the block division to the chrominance signals. While a case where the shape of the block division is same for the luminance signals and the chrominance signals will be mainly described below, the division may be independently controllable for the luminance signals and the chrominance signals. Note that the luminance block and the chrominance block are referred to simply as the encoding target block when the blocks are not particularly distinguished from each other.

The subtractor 110 calculates prediction residuals that represent differences (errors) between an encoding-target block outputted from the block divider 100 and a prediction block obtained by the predictor 170 predicting the encoding-target block. Specifically, the subtractor 110 calculates a prediction residual by subtracting each pixel value in the prediction block from each pixel value in the block, and outputs the calculated prediction residuals to the transformer/quantizer 120.

The transformer/quantizer 120 performs an orthogonal transform process and a quantization process in block units. The transformer/quantizer 120 includes a transformer 121 and a quantizer 122.

The transformer 121 calculates orthogonal transform coefficients by performing the orthogonal transform process on the prediction residuals outputted from the subtractor 110, and outputs the calculated orthogonal transform coefficients to the quantizer 122. Orthogonal transform is, for example, discrete cosine transform (DCT), discrete sine transform (DST), Karhunen Loeve transform (KLT), or the like.

The quantizer 122 quantizes the orthogonal transform coefficients output from the transformer 121 using a quantization parameter (Qp) and a quantization matrix and outputs the quantized orthogonal transform coefficients to the entropy encoder 130 and the inverse quantizer/inverse transformer 140. Note that the quantization parameter (Qp) is a parameter to be applied in common to respective orthogonal transform coefficients within a block and is a parameter that determines quantization granularity. The quantization matrix is a matrix having quantization values for quantizing the respective orthogonal transform coefficients, as elements.

The entropy encoder 130 performs entropy encoding to the orthogonal transform coefficients outputted from the quantizer 122, generates encoded data (bit stream) by performing data compression and outputs the encoded data to an outside of the image encoding device 1. For the entropy encoding, Huffman coding and/or CABAC (Context-based Adaptive Binary Arithmetic Coding) or the like can be used. Note that the entropy encoder 130 receives input of information of a flag and an identifier or the like regarding prediction from the predictor 170 and also performs the entropy encoding of the inputted information.

The inverse quantizer/inverse transformer 140 executes an inverse quantization process and an inverse orthogonal transform process on each of blocks. The inverse quantizer/inverse transformer 140 includes an inverse quantizer 141 and an inverse transformer 142.

The inverse quantizer 141 performs the inverse quantization process corresponding to the quantization process performed by the quantizer 122. More specifically, the inverse quantizer 141 inverse quantizes the orthogonal transform coefficients outputted from the quantizer 122 by using the quantization parameter (Qp) and the quantization matrix to restore the orthogonal transform coefficients, and outputs the restored orthogonal transform coefficients to the inverse transformer 142.

The inverse transformer 142 performs the inverse orthogonal transform process corresponding to the orthogonal transform process performed by the transformer 121. For example, when the transformer 121 performs discrete cosine transform, the inverse transformer 142 performs inverse discrete cosine transform. The inverse transformer 142 restores the prediction residuals by performing the inverse orthogonal transform process on the orthogonal transform coefficients outputted from the inverse quantizer 141, and outputs restoration prediction residuals that are the restored prediction residuals to the combiner 150.

The combiner 150 combines the restoration prediction residual outputted from the inverse transformer 142 with a prediction block outputted from the predictor 170 in pixel units. The combiner 150 decodes (reconstructs) an encoding target block by adding individual pixel values of the restoration prediction residual and individual pixel values of the prediction block, and outputs a decoded block to the memory 160. Note that the decoded block is sometimes referred to as a reconstructed block.

The memory 160 stores the decoded block outputted from the combiner 150 and accumulates the decoded block as decoded images in frame units. The memory 160 outputs the stored decoded block or decoded images to the predictor 170. Note that a loop filter may be provided between the combiner 150 and the memory 160.

The predictor 170 performs the prediction in block units. The predictor 170 includes an inter predictor 171, an intra predictor 172 and a switcher 173. In the present embodiment, the intra predictor 172 corresponds to an intra prediction device provided in the image encoding device 1.

The inter predictor 171 calculates a motion vector through a scheme such as block matching by using the decoded images stored in the memory 160 as reference images, generates an inter prediction block by predicting the encoding target block, and outputs the generated inter prediction block to the switcher 173. Here, the inter predictor 171 selects an optimal inter prediction method from inter prediction using a plurality of reference images (typically, bi-prediction) and/or inter prediction using one reference image (uni-directional prediction), and performs the inter prediction by using the selected inter prediction method. The inter predictor 171 outputs information regarding the inter prediction (the motion vector and the like) to the entropy encoder 130.

The intra predictor 172 generates an intra prediction block by referring to decoded pixels present around the encoding target block of the decoded image stored in the memory 160, and outputs the generated intra prediction block to the switcher 173. Generally, the intra predictor 172 selects an intra prediction mode to be applied to a prediction target block of intra prediction from among a plurality of intra prediction modes, and predicts the intra prediction target block by using the selected intra prediction mode. The intra predictor 172 outputs information regarding the selected intra prediction mode to the entropy encoder 130.

The switcher 173 switches the inter prediction block outputted from the inter predictor 171 and the intra prediction block outputted from the intra predictor 172 and outputs one of the prediction blocks to the subtracter 110 and the combiner 150.

In the image encoding device 1 configured in this way, the intra predictor 172 performs the intra prediction to the luminance block and the chrominance block. Here, candidates of the intra prediction mode for the luminance block are planar prediction, DC prediction and 65 ways of directional prediction, and there are a total of 67 ways of the intra prediction modes.

Figure 2:
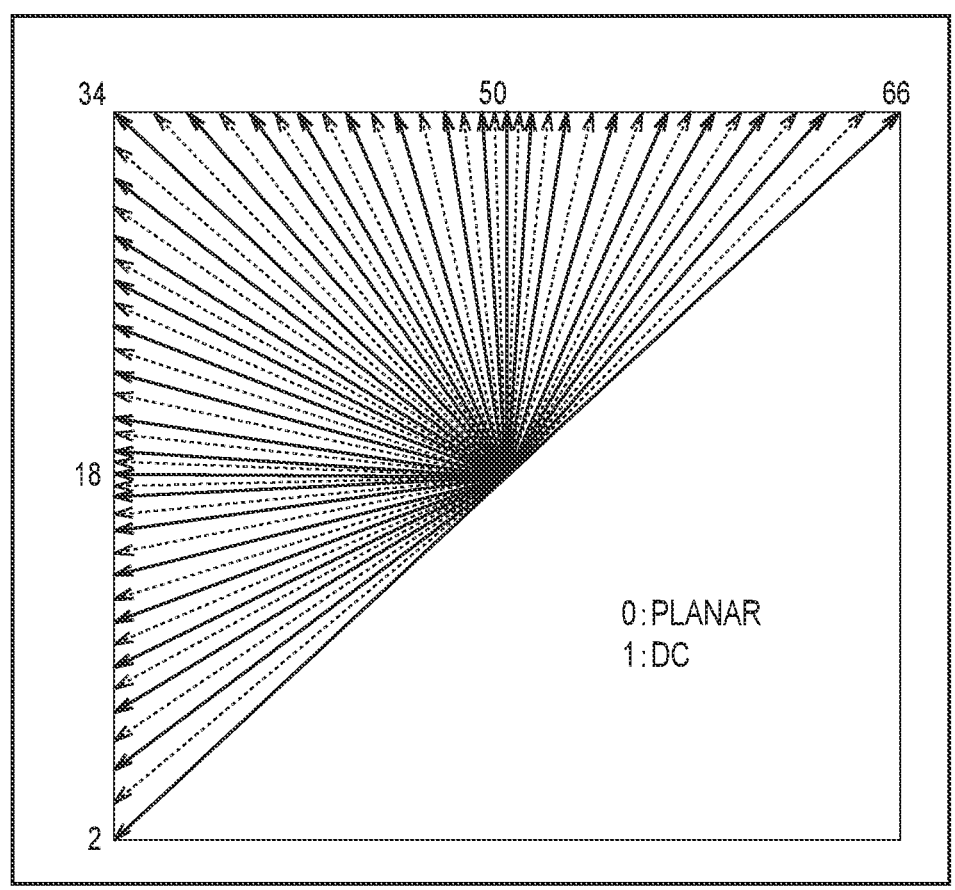
FIG. 2 is a diagram illustrating candidates of an intra prediction mode of a luminance block relating to the embodiment.

FIG. 2 is a diagram illustrating candidates of the intra prediction mode for the luminance block relating to the present embodiment. Here, the candidates of the intra prediction mode used for the luminance block of the encoding target block are indicated. As illustrated in FIG. 2, there are 67 prediction modes from 0 to 66, a mode "0" of the prediction modes is the planar prediction, a mode "1" of the prediction modes is the DC prediction, and modes "2" to "66" of the prediction modes are the directional prediction. In the directional prediction, a direction of an arrow indicates a reference direction, an origin of the arrow indicates the position of a prediction target pixel, and an end point of the arrow indicates the position of the reference pixel to be used to predict the prediction target pixel. As the reference directions parallel to a diagonal line passing through an upper right vertex and a lower left vertex of the block, there are the mode "2" which is the prediction mode of referring to a lower left direction and the mode "66" which is the prediction mode of referring to an upper right direction, and mode numbers are allocated at every predetermined angle clockwise from the mode "2" to the mode "66".

On the other hand, the number of the candidates of the intra prediction mode for the chrominance block is smaller than the number of the candidates of the intra prediction mode for the luminance block. Specifically, in the intra prediction of the chrominance block, the intra predictor 172 determines the intra prediction mode used for the intra prediction of the luminance block present at the position corresponding to the position of the chrominance block as a first candidate mode, determines a second candidate mode not overlapping with the first candidate mode, and selects the intra prediction mode to be used for the intra prediction of the chrominance block from the candidate modes. Such a first candidate mode is referred to as DM (Direction Mode or Derived Mode).

In addition, when one mode of default modes predetermined as the second candidate mode and the first candidate mode (DM) overlap, the intra predictor 172 determines an alternative mode to be used as the second candidate mode instead of the overlapping default mode. Here, the default modes are a planar mode (mode 0), a vertical mode (mode 50), a horizontal mode (mode 18) and a DC mode (mode 1). As the alternative mode, a fixed intra prediction mode other than the default modes, the mode 66 for example, is used.

Note that, the luminance block present at the position corresponding to the position of the chrominance block is the luminance block present at the same position as the position of the chrominance block, when block division shapes of the luminance block and the chrominance block are the same. However, when the block division shape of the luminance and the block division shape of the chrominance can be independently controlled, the luminance block present at the position corresponding to the position of the chrominance block is the luminance block including coordinates corresponding to a predefined pixel position in the chrominance block (for example, upper left coordinates of the chrominance block). Here, the coordinates corresponding to the predefined pixel position in the chrominance block are not always the same coordinates since there is a case where luminance and chrominance sizes are different in the chrominance format of 4:2:0 or the like.

Further, as the intra prediction mode peculiar to the chrominance block, there is cross-component linear model prediction (CCLM) of predicting a prediction target chrominance block from the decoded luminance block present at the position corresponding to the position of the chrominance block using a linear model calculated from the respective luminance and the chrominance reference pixels present around the chrominance block. In the CCLM, selection is possible from three CCLM modes in which the positions of the luminance and chrominance reference pixels to be used to calculate the linear model (referred to as "linear model calculation pixel positions" hereinafter) are different.

FIG. 3 are diagrams illustrating the three CCLM modes relating to the present embodiment. FIG. 3 illustrate an example in which the linear model calculation pixel positions are four pixel positions.

An LT_CCLM mode illustrated in FIG. 3A is the CCLM mode in which the positions on both upper side and left side of the prediction target chrominance block are the linear model calculation pixel positions. When the LT_CCLM mode is selected, that is, when the positions on both upper and left side of the prediction target chrominance block are selected as the linear model calculation pixel positions, the intra predictor 172 calculates the linear model using reference pixels #1-#4 on the upper side and on the left side illustrated in FIG. 3A.

A T_CCLM mode illustrated in FIG. 3B is the CCLM mode in which the positions on the upper side of the prediction target chrominance block are the linear model calculation pixel positions. When the T_CCLM mode is selected, that is, when the positions on the upper side of the prediction target chrominance block are selected as the linear model calculation pixel positions, the intra predictor 172 calculates the linear model using the reference pixels #1-#4 on the upper side illustrated in FIG. 3B.

An L_CCLM mode illustrated in FIG. 3C is the CCLM mode in which the positions on the left side of the prediction target chrominance block are the linear model calculation pixel positions. When the T_CCLM mode is selected, that is, when the positions on the left side of the prediction target chrominance block are selected as the linear model calculation pixel positions, the intra predictor 172 calculates the linear model using the reference pixels #1-#4 on the left side illustrated in FIG. 3C.

Figure 4:
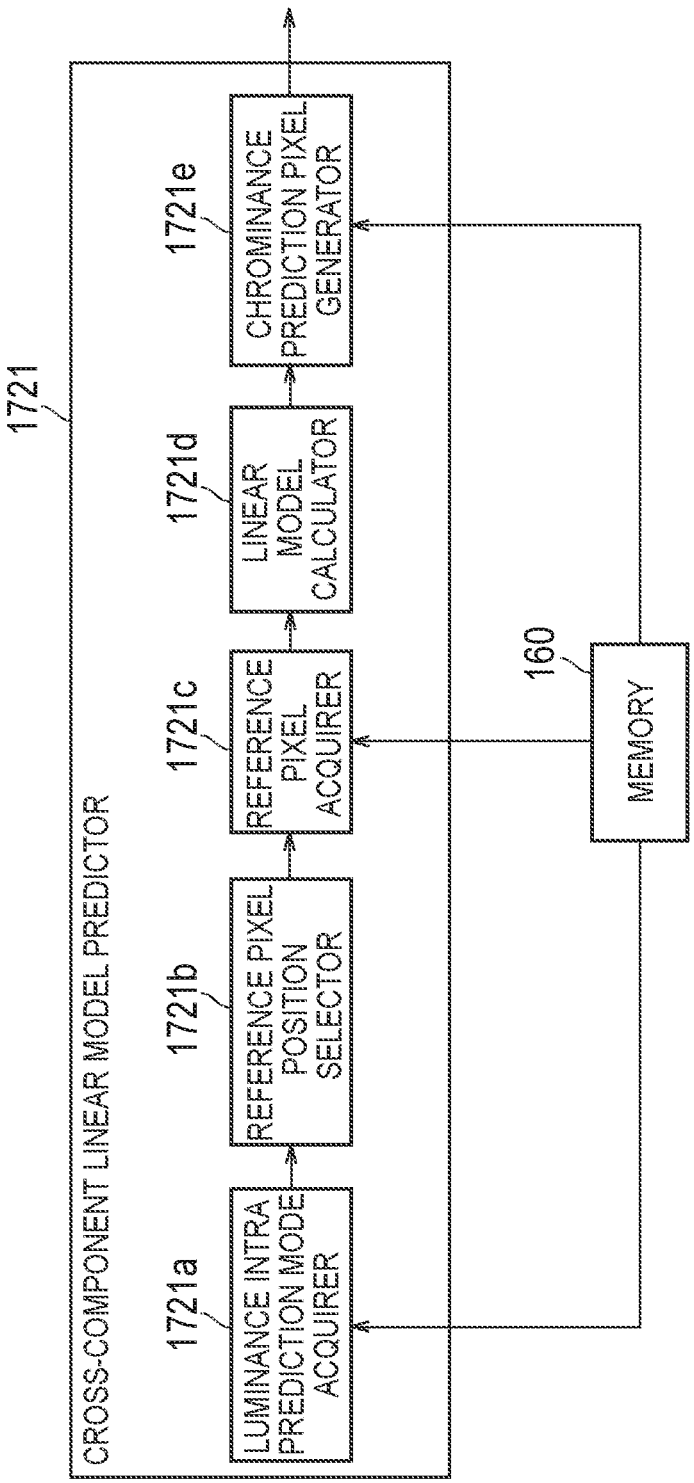
FIG. 4 is a diagram illustrating a configuration of a cross-component linear model predictor of the image encoding device relating to the embodiment.

The intra predictor 172 includes a cross-component linear model predictor 1721 configured to predict the prediction target chrominance block by the CCLM. FIG. 4 is a diagram illustrating a configuration of the cross-component linear model predictor 1721 relating to the present embodiment.

As illustrated in FIG. 4, the cross-component linear model predictor 1721 includes a luminance intra prediction mode acquirer 1721*a*, a reference pixel position selector 1721*b*, a reference pixel acquirer 1721*c*, a linear model calculator 1721*d* and a chrominance prediction pixel generator 1721*e*.

The luminance intra prediction mode acquirer 1721*a* acquires a luminance intra prediction mode which is the intra prediction mode applied to the decoded luminance block present at the position corresponding to the position of the prediction target chrominance block from the memory 160. Specifically, the luminance intra prediction mode acquirer 1721*a* acquires the mode number (one of 0-66) of the luminance intra prediction mode and outputs the acquired mode number to the reference pixel position selector 1721*b*.

However, when the inter prediction is applied to the decoded luminance block present at the position corresponding to the position of the prediction target chrominance block, or when the luminance block present at the position corresponding to the position of the prediction target chrominance block is not decoded (that is, not decoded yet), the luminance intra prediction mode acquirer 1721*a* outputs information of that effect to the reference pixel position selector 1721*b*.

The reference pixel position selector 1721*b* selects the linear model calculation pixel positions which are the positions of the reference pixels to be used to calculate the linear model based on the luminance intra prediction mode acquired by the luminance intra prediction mode acquirer 1721*a*. In the present embodiment, the reference pixel position selector 1721*b* selects one CCLM mode to be applied to the prediction target chrominance block from the three CCLM modes described above based on the mode number of the luminance intra prediction mode outputted from the luminance intra prediction mode acquirer 1721*a*, and outputs CCLM mode information indicating the selected CCLM mode to the reference pixel acquirer 1721*c*.

In such a manner, in the present embodiment, attention is paid to a point that spatial features of the luminance components and the chrominance components at the same position in the image are similar and the linear model calculation pixel positions are selected based on the luminance intra prediction mode. For example, when the intra prediction mode of performing the intra prediction using only the reference pixels positioned on the left side to the luminance block is applied, it is highly possible that the CCLM mode of calculating the linear model using only the reference pixels on the left side (that is, the L_CCLM mode) is used also for the intra prediction of the corresponding chrominance block.

Here, the luminance intra prediction mode is information that can be utilized in both of the image encoding device 1 and an image decoding device. Therefore, by implicitly selecting the linear model calculation pixel positions based on the luminance intra prediction mode in both of the image encoding device 1 and the image decoding device, need of transmitting the CCLM mode information from the image encoding device to the image decoding device side is eliminated. Thus, increase of additional information to be transmitted can be suppressed and encoding efficiency can be improved.

In the present embodiment, when the luminance intra prediction mode is the intra prediction mode of referring to the reference pixels on both upper side and lower side of the luminance block, the reference pixel position selector 1721*b* selects the positions on both upper side and lower side of the prediction target chrominance block as the linear model calculation pixel positions. In other words, when the luminance intra prediction mode is the intra prediction mode of referring to the reference pixels on both upper side and left side of the luminance block, the reference pixel position selector 1721*b* selects the LT_CCLM mode.

The case where the luminance intra prediction mode is the intra prediction mode of referring to the reference pixels on both upper side and left side of the luminance block is, for example, when assuming a square luminance block in VVC, the case where the mode number of the luminance intra prediction mode is one of 0 (planar prediction mode), 1 (DC prediction mode) and 19-49 of a directional prediction mode.

In addition, when the luminance intra prediction mode is the intra prediction mode of referring to the reference pixels on the upper side of the luminance block without referring to the reference pixels on the left side of the luminance block, the reference pixel position selector 1721*b* selects the positions on the upper side of the prediction target chrominance block as the linear model calculation pixel positions. In other words, when the luminance intra prediction mode is the intra prediction mode of referring to the reference pixels on the upper side of the luminance block without referring to the reference pixels on the left side of the luminance block, the reference pixel position selector 1721*b* selects the T_CCLM mode.

The case where the luminance intra prediction mode is the intra prediction mode of referring to the reference pixels on the upper side of the luminance block without referring to the reference pixels on the left side of the luminance block is, for example, when assuming the square luminance block in the VVC, the case where the mode number of the luminance intra prediction mode is one of 50-66.

Further, when the luminance intra prediction mode is the intra prediction mode of referring to the reference pixels on the left side of the luminance block without referring to the reference pixels on the upper side of the luminance block, the reference pixel position selector 1721*b* selects the positions on the left side of the prediction target chrominance block as the linear model calculation pixel positions. In other words, when the luminance intra prediction mode is the intra prediction mode of referring to the reference pixels on the left side of the luminance block without referring to the reference pixels on the upper side of the luminance block, the reference pixel position selector 1721*b* selects the L_CCLM mode.

The case where the luminance intra prediction mode is the intra prediction mode of referring to the reference pixels on the left side of the luminance block without referring to the reference pixels on the upper side of the luminance block is, for example, when assuming the square luminance block in the VVC, the case where the mode number of the luminance intra prediction mode is one of 2-18.

In this way, according to the present embodiment, a property that the spatial features of the luminance components and the chrominance components at the same position in the image are similar is utilized and the appropriate CCLM mode can be selected from the three CCLM modes based on the luminance intra prediction mode.

However, when the inter prediction is applied to the decoded luminance block, or when the luminance block present at the position corresponding to the position of the chrominance block is not decoded, the reference pixel position selector 1721b selects the positions of predetermined reference pixels as the linear model calculation pixel positions. For example, when the inter prediction is applied to the decoded luminance block, or when the luminance block present at the position corresponding to the position of the chrominance block is not decoded, the reference pixel position selector 1721b selects the LT_CCLM mode.

The reference pixel acquirer 1721c acquires the luminance and chrominance reference pixels present at the linear model calculation pixel positions selected by the reference pixel position selector 1721b from the memory 160 based on the CCLM mode information outputted from the reference pixel position selector 1721b, and outputs the individual acquired reference pixels to the linear model calculator 1721d.

For example, when it is assumed that the size of the prediction target chrominance block is W×H, the reference pixel acquirer 1721c acquires four adjacent chrominance pixels and down-sampled luminance pixels corresponding to them. Specifically, the reference pixel acquirer 1721c determines the positions of the four adjacent pixels by following expressions (1).

When the LT_CCLM mode is applied:

$$S[W'/4,-1], S[3W'/4,-1], S[-1,H'/4], S[-1,3H'/4]$$

When the T_CCLM mode is applied:

$$S[W'/8,-1], S[3W'/8,-1], S[5W'/8,-1], S[7W'/8,-1]$$

When the L_CCLM mode is applied:

$$S[-1,H'/8], S[-1,3H'/8], S[-1,5H'/8], S[-1,7H'/8] \quad (8)$$

It is W'=W and H'=H when the LT_CCLM mode is applied, it is W'=W+H when the T_CCLM mode is applied, and it is H'=H+W when the L_CCLM mode is applied.

The linear model calculator 1721d calculates the linear model using the individual reference pixels (specifically, four chrominance reference pixels and four luminance reference pixels corresponding to them) outputted from the reference pixel acquirer 1721c.

For example, the linear model calculator 1721d compares the four luminance reference pixels with each other, specifies two small values ($x^0_A$, $x^1_A$) and two large values ($x^0_B$, $x^1_B$) and specifies the chrominance reference pixels corresponding to them as $y^0_A$, $y^1_A$, $y^0_B$ and $y^1_B$.

Then, the linear model calculator 1721d calculates $X_a$, $X_b$, $Y_a$ and $Y_b$ by following expressions (2).

$$X_a = (x^0_A + x^1_A + 1) \gg 1$$

$$X_b = (x^0_B + x^1_B + 1) \gg 1$$

$$Y_a = (y^0_A + y^1_A + 1) \gg 1$$

$$Y_b = (y^0_B + y^1_B + 1) \gg 1 \quad (2)$$

Finally, the linear model calculator 1721d calculates parameters α and β of the linear model by following expressions (3), and outputs the calculated parameters α and β of the linear model to the chrominance prediction pixel generator 1721e.

[Expression 1]

$$a = \frac{Y_a - Y_b}{X_a - X_b} \quad (3)$$

$$\beta = Y_b - a \cdot X_b$$

The chrominance prediction pixel generator 1721e generates prediction pixels within the prediction target chrominance block using the linear model (parameters α and β) calculated by the linear model calculator 1721d, and outputs a chrominance prediction block formed of the generated prediction pixels. For example, the chrominance prediction pixel generator 1721e calculates individual prediction pixels $pred_C(i,j)$ for the chrominance by a following expression (4).

[Expression 2]

$$pred_C(i,j) = \alpha \cdot rec_L'(i,j) + \beta \quad (4)$$

However, i and j indicate coordinate positions in a horizontal direction and a vertical direction respectively. In addition, the down-sampled decoded pixel within the decoded luminance block present at the position corresponding to the prediction target chrominance block is filter-processed for $rec_L'(i,j)$.

In such a manner, the intra predictor 172 outputs the chrominance prediction block. When the CCLM is applied to the prediction target chrominance block, the intra predictor 172 just needs to output the information indicating that the CCLM is applied to the entropy encoder 130, and does not need to output the CCLM mode information indicating which mode is selected from the CCLM to the entropy encoder 130.

<Configuration of Image Decoding Device>

Figure 5:
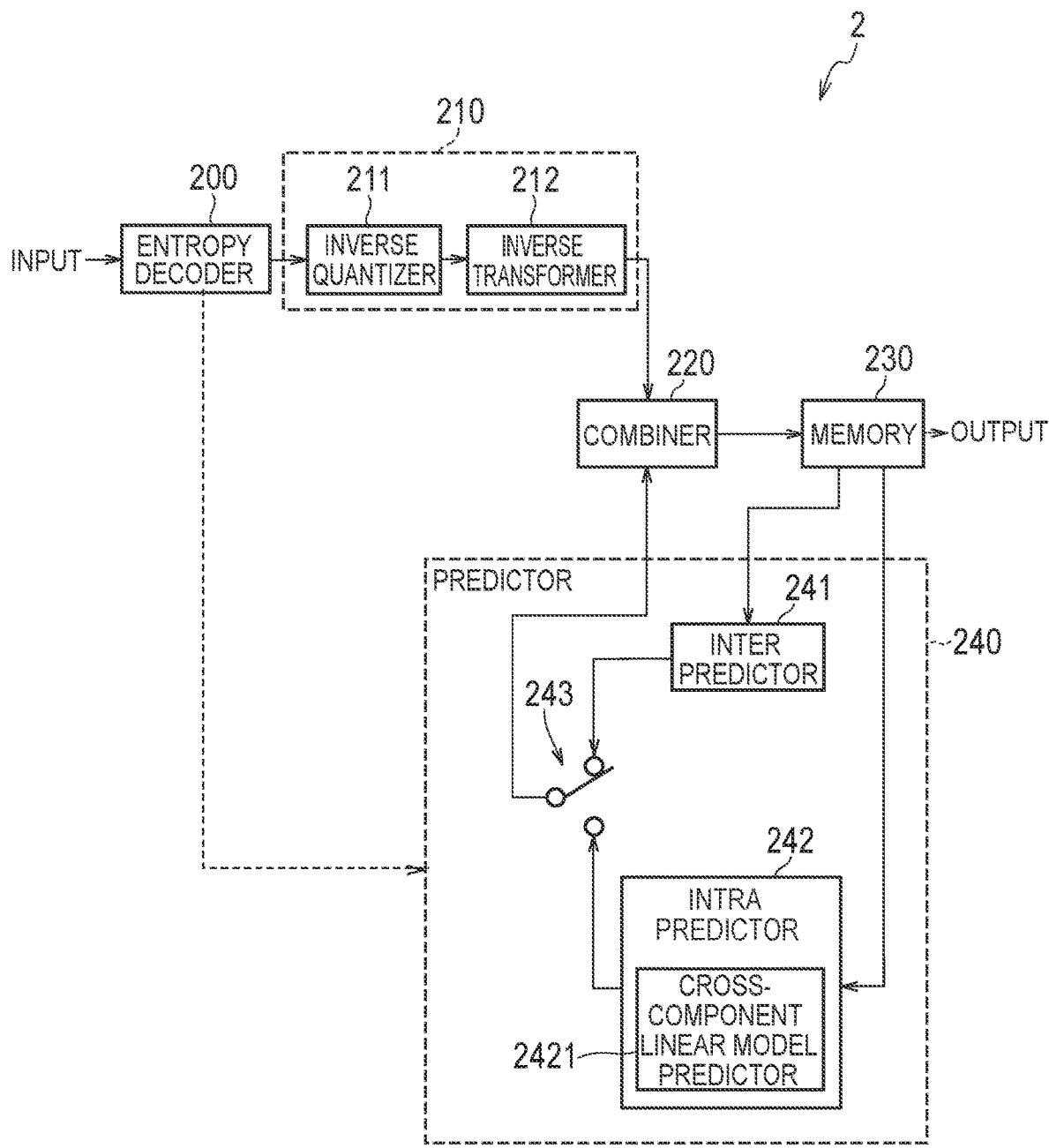
FIG. 5 is a diagram illustrating a configuration of an image decoding device according to the embodiment.

Next, the configuration of the image decoding device relating to the present embodiment will be described. FIG. 5 is a diagram illustrating the configuration of an image decoding device 2 relating to the present embodiment.

As illustrated in FIG. 5, the image decoding device 2 includes an entropy decoder 200, an inverse quantizer/inverse transformer 210, a combiner 220, a memory 230, and a predictor 240.

The entropy decoder 200 decodes the encoded data generated by the image encoding device 1, and outputs quantized orthogonal transform coefficients to the inverse quantizer/inverse transformer 210. In addition, the entropy decoder 200 acquires information regarding the prediction (intra prediction and inter prediction) and outputs the acquired information to the predictor 240. In the present embodiment, the entropy decoder 200 acquires information indicating that the CCLM is applied to the chrominance block, and outputs the acquired information to the predictor 240 (intra predictor 242).

The inverse quantizer/inverse transformer 210 executes an inverse quantization process and an inverse orthogonal transform process on each of blocks. The inverse quantizer/inverse transformer 210 includes an inverse quantizer 211 and an inverse transformer 212.

The inverse quantizer 211 performs the inverse quantization process corresponding to the quantization process performed by the quantizer 122 of the image encoding device 1. The inverse quantizer 211 restores the orthogonal transform coefficients of the decoding target block by inversely quantizing the quantized orthogonal transform coefficients outputted from the entropy decoder 200 using the quantization parameter (Qp) and the quantization matrix, and outputs the restored orthogonal transform coefficients to the inverse transformer 212.

The inverse transformer 212 performs the inverse orthogonal transform process corresponding to the orthogonal transform process performed by the transformer 121 of the image encoding device 1. The inverse transformer 212 restores prediction residuals by performing the inverse orthogonal transform process on the orthogonal transform coefficients outputted from the inverse quantizer 211, and outputs the restored prediction residuals (restoration prediction residuals) to the combiner 220.

The combiner 220 decodes (reconstructs) an original block by combining the prediction residual outputted from the inverse transformer 212 and the prediction block outputted from the predictor 240 in pixel units, and outputs the decoded block to the memory 230.

The memory 230 stores the decoded block outputted from the combiner 220 and accumulates the decoded block as decoded images in frame units. The memory 230 outputs the decoded block or the decoded images to the predictor 240. In addition, the memory 230 outputs the decoded images in frame units to the outside of the image decoding device 2. Note that a loop filter may be provided between the combiner 220 and the memory 230.

The predictor 240 performs the prediction in block units. The predictor 240 includes an inter predictor 241, an intra predictor 242 and a switcher 243. In the present embodiment, the intra predictor 242 corresponds to an intra prediction device provided in the image decoding device 2.

The inter predictor 241 predicts the decoding target block by the inter prediction using the decoded images stored in the memory 230 as the reference images. The inter predictor 241 generates an inter prediction block by performing the inter prediction according to motion vector information or the like outputted from the entropy decoder 200, and outputs the generated inter prediction block to the switcher 243.

The intra predictor 242 generates an intra prediction block by referring to the decoded pixels present around the prediction target block (decoding target block) of the decoded images stored in the memory 230, and outputs the generated intra prediction block to the switcher 243. The intra predictor 242 corresponds to an intra prediction device provided in the image decoding device 2. The intra predictor 242 includes a cross-component linear model predictor 2421.

The switcher 243 switches the inter prediction block outputted from the inter predictor 241 and the intra prediction block outputted from the intra predictor 242, and outputs one of the prediction blocks to the combiner 220.

Figure 6:
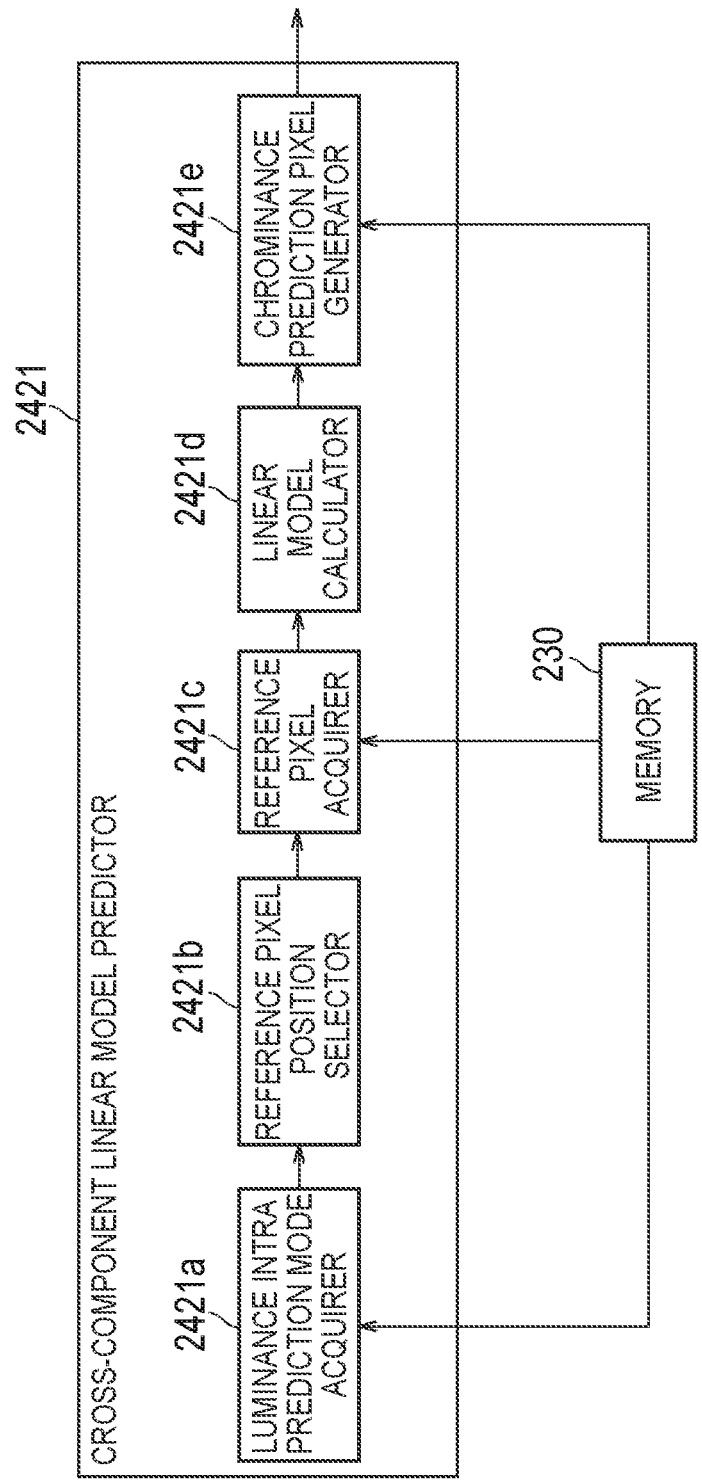
FIG. 6 is a diagram illustrating a configuration of a cross-component linear model predictor of the image decoding device relating to the embodiment.

FIG. 6 is a diagram illustrating a configuration of the cross-component linear model predictor 2421 of the image decoding device 2 relating to the present embodiment.

As illustrated in FIG. 6, the cross-component linear model predictor 2421 includes a luminance intra prediction mode acquirer 2421a, a reference pixel position selector 2421b, a reference pixel acquirer 2421c, a linear model calculator 2421d and a chrominance prediction pixel generator 2421e.

The luminance intra prediction mode acquirer 2421a, the reference pixel position selector 2421b, the reference pixel acquirer 2421c, the linear model calculator 2421d and the chrominance prediction pixel generator 2421e perform operations respectively similar to the luminance intra prediction mode acquirer 1721a, the reference pixel position selector 1721b, the reference pixel acquirer 1721c, the linear model calculator 1721d and the chrominance prediction pixel generator 1721e illustrated in FIG. 4.

Operation Flow Example of Intra Prediction

Next, the operation flow example of the intra prediction relating to the present embodiment will be described. While the operation of the intra prediction is the same in the image encoding device 1 and the image decoding device 2, the operation of the intra prediction (intra predictor 242) in the image decoding device 2 will be described here.

Figure 7:
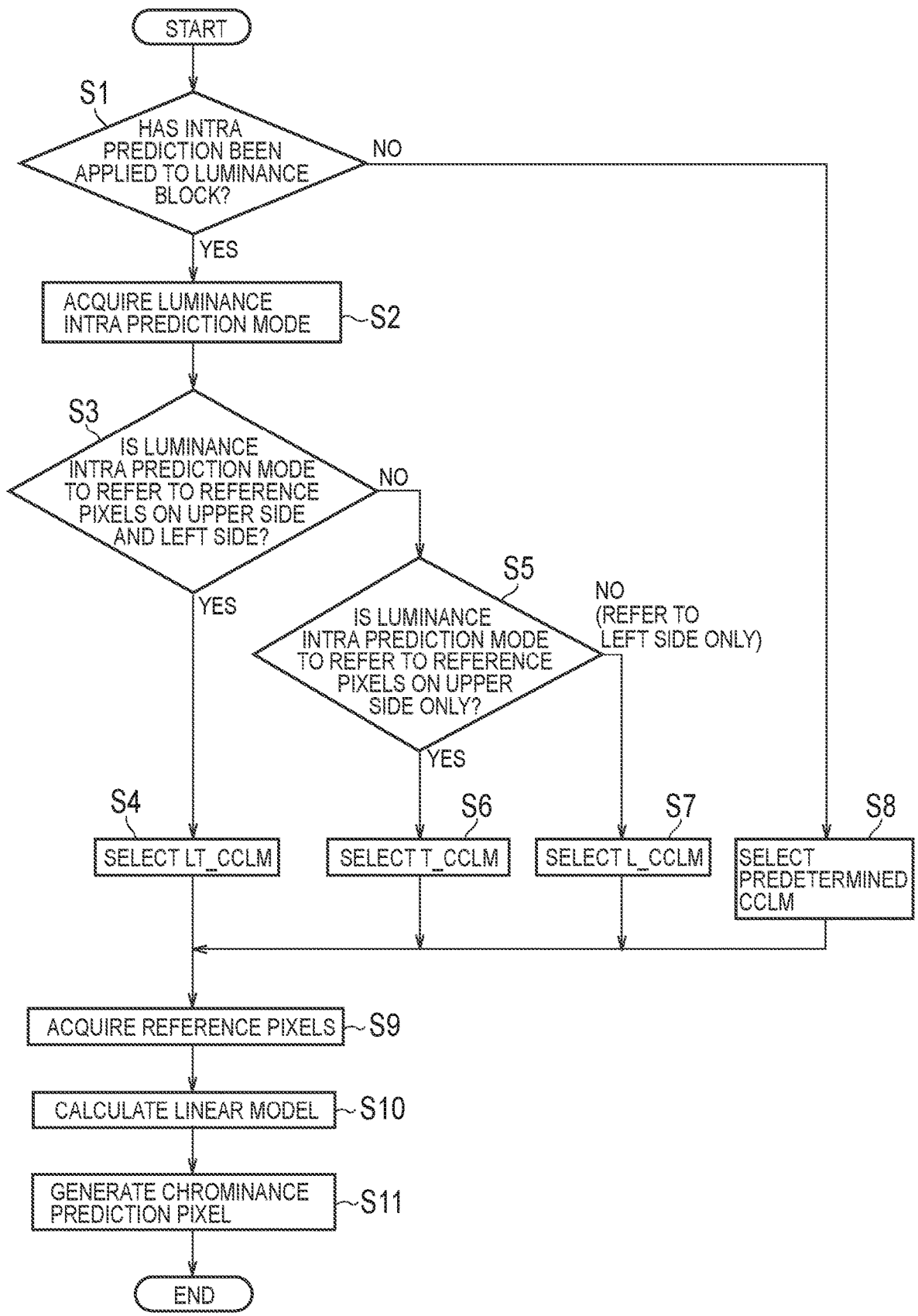
FIG. 7 is a diagram illustrating an operation of intra prediction in the image decoding device relating to the embodiment.

FIG. 7 is a diagram illustrating the operation of the intra prediction (intra predictor 242) in the image decoding device 2 relating to the present embodiment.

Prior to the operation illustrated in FIG. 7, the intra predictor 242 generates candidates of the intra prediction mode of a certain chrominance block based on an intra prediction mode IntraPredModeY of the luminance block present at a position [xCb+cbWidth/2][yCb+cbHeight/2] corresponding to the position [xCb] [yCb] of the chrominance block, as illustrated in Table 1.

TABLE 1

| intra_chroma_pred_mode [xCb][yCb] | IntraPredModeY [xCb + cbWidth/2 [yCb + cbHeight/2] | | | | |
|---|---|---|---|---|---|
| | 0 | 50 | 18 | 1 | X (0 <= X <= 66) |
| 0 | 66 | 0 | 0 | 0 | 0 |
| 1 | 50 | 66 | 50 | 50 | 50 |
| 2 | 18 | 18 | 66 | 18 | 18 |
| 3 | 1 | 1 | 1 | 66 | 1 |
| 4 | Y | Y | Y | Y | Y |
| 7 | 0 | 50 | 18 | 1 | X |

Here, X corresponds to the DM and Y corresponds to the CCLM.

As described above, in the present embodiment, the CCLM mode information that identifies the three CCLM modes is not transmitted. Thus, from the image encoding device 1 to the image decoding device 2, the CCLM mode information is not transmitted and information intra_chroma_pred_mode indicating the intra prediction mode applied to the chrominance block is transmitted.

Here, in the intra_chroma_pred_mode, as illustrated in Table 2, a shortest symbol length is allocated to the DM and the next shortest symbol length is allocated to the CCLM.

TABLE 2

| intra_chroma_pred_mode | Symbol |
|---|---|
| 7 | 0 |
| 4 | 10 |
| 0 | 1100 |
| 1 | 1101 |
| 2 | 1110 |
| 3 | 1111 |

The operation flow below is described assuming that the information intra_chroma_pred_mode indicating the intra prediction mode applied to the chrominance block is "4", that is, the value indicating the CCLM.

As illustrated in FIG. 7, in step S1, the luminance intra prediction mode acquirer 2421a determines whether or not the intra prediction has been applied to the decoded luminance block present at the position corresponding to the position of the prediction target chrominance block. When the inter prediction is applied to the decoded luminance block present at the position corresponding to the position of the prediction target chrominance block, or when the luminance block present at the position corresponding to the position of the prediction target chrominance block is not decoded (that is, not decoded yet), the process is advanced to step S8.

When the intra prediction has been applied to the decoded luminance block present at the position corresponding to the position of the prediction target chrominance block (step S1: YES), in step S2, the luminance intra prediction mode acquirer 2421a acquires the luminance intra prediction mode which is the intra prediction mode applied to the decoded luminance block present at the position corresponding to the position of the prediction target chrominance block from the memory 230.

Specifically, the luminance intra prediction mode acquirer 2421a acquires the mode number (one of 0-66) of the luminance intra prediction mode, and outputs the acquired mode number to the reference pixel position selector 2421b. However, in the VVC, when an aspect ratio of the luminance block is not 1:1, the mode number of the intra prediction mode is replaced by WAIP (Wide Angle Intra Prediction). Therefore, the replaced mode number is defined as the mode number of the luminance intra prediction mode.

In step S3, the reference pixel position selector 2421b determines whether or not the luminance intra prediction mode is the intra prediction mode of referring to the reference pixels on both upper side and left side of the luminance block. When it is "YES" in step S3 (step S3: YES), in step S4, the reference pixel position selector 2421b selects the positions on both upper side and left side of the prediction target chrominance block as the linear model calculation pixel positions, that is, selects the LT_CCLM mode.

When it is "NO" in step S3, in step S5, the reference pixel position selector 2421b determines whether or not the luminance intra prediction mode is the intra prediction mode of referring to the reference pixels on the upper side of the luminance block without referring to the reference pixels on the left side of the luminance block. When it is "YES" in step S5, in step S6, the reference pixel position selector 2421b selects the positions on the upper side of the prediction target chrominance block as the linear model calculation pixel positions, that is, selects the T_CCLM mode.

When it is "NO" in step S5, specifically when the luminance intra prediction mode is the intra prediction mode of referring to the reference pixels on the left side of the luminance block without referring to the reference pixels on the upper side of the luminance block, in step S7, the reference pixel position selector 2421b selects the positions on the left side of the prediction target chrominance block as the linear model calculation pixel positions, that is, selects the L_CCLM mode.

Here, the operation of steps S3-S7 is summarized as being equal to the reference pixel position selector 2421b selecting the Y (CCLM mode) in Table 1 described above by Table 3.

TABLE 3

| Luminance intra prediction mode (L) | Y |
|---|---|
| Planar(0), DC(1), $Th_L < L < Th_T$ | 81(INTRA_LT_CCLM) |
| $L <= Th_L$ | 82(INTRA_L_CCLM) |
| $Th_T <= L$ | 83(INTRA_T_CCLM) |

On the other hand, when it is "NO" in step S1, in step S8, the reference pixel position selector 2421b selects the positions of the predetermined reference pixels as the linear model calculation pixel positions, and selects the LT_CCLM mode for example.

After the linear model calculation pixel positions (CCLM mode) are selected, in step S9, the reference pixel acquirer 2421c acquires the luminance and chrominance reference pixels present at the linear model calculation pixel positions selected by the reference pixel position selector 2421b from the memory 230, and outputs the individual acquired reference pixels to the linear model calculator 2421d by the expression (1) described above.

In step S10, the linear model calculator 2421d calculates the linear model by the expressions (2) and the expressions (3) described above, using the individual reference pixels (specifically, the four chrominance reference pixels and the four luminance reference pixels corresponding to them) outputted from the reference pixel acquirer 2421c.

In step S11, the chrominance prediction pixel generator 2421e generates the prediction pixels within the prediction target chrominance block by the expression (4) described above using the linear model (parameters $\alpha$ and $\beta$) calculated by the linear model calculator 2421d, and outputs the chrominance prediction block formed of the generated prediction pixels.

Summary of Embodiment

As described above, the reference pixel position selector 1721b (and 2421b) selects the linear model calculation pixel positions which are the positions of the reference pixels to be used to calculate the linear model based on the luminance intra prediction mode acquired by the luminance intra prediction mode acquirer 1721a (and 2421a). Specifically, the reference pixel position selector 1721b (and 2421b) selects one CCLM mode to be applied to the prediction target chrominance block from the three CCLM modes based on the mode number of the luminance intra prediction mode outputted from the luminance intra prediction mode acquirer 1721a (and 2421a).

In such a manner, by implicitly selecting the linear model calculation pixel positions based on the luminance intra prediction mode in both of the image encoding device 1 and the image decoding device 2, the need of transmitting the CCLM mode information from the image encoding device 1 to the image decoding device 2 is eliminated. In addition, in the present embodiment, the attention is paid to the point that the spatial features of the luminance components and the chrominance components at the same position in the image are similar and the appropriate linear model calculation pixel positions according to the luminance intra prediction mode can be selected. Accordingly, since the chrominance block can be accurately predicted by the CCLM while suppressing the increase of the additional information to be transmitted, the encoding efficiency can be improved.

Other Embodiments

A program may be provided to cause a computer to execute the operations of the image encoding device 1. A program may be provided to cause a computer to execute the operations of the image decoding device 2. The program may be stored in a computer-readable medium. The program can be installed on a computer from a computer-readable medium having the program stored thereon. The computer-readable medium having the program stored thereon may be a non-transitory recording medium. The non-transitory recording medium may include, but is not limited to, a CD-ROM and a DVD-ROM for example.

The image encoding device 1 may be embodied as a semiconductor integrated circuit (chipset, SoC, etc.) by integrating the circuits that execute the respective operations of the image encoding device 1. The image decoding device 2 may be embodied as a semiconductor integrated circuit (chipset, SoC, etc.) by integrating the circuits that execute the respective operations of the image decoding device 2.

The embodiments have been described in detail above with reference to the drawings. Specific configurations are not limited to the above-described configurations, and various design changes, and the like are possible within the scope not deviating from the gist.

The invention claimed is:

1. An intra prediction device that predicts, by intra prediction, a luminance block and a chrominance block obtained by dividing an image, the intra prediction device comprising:
a cross-component linear model predictor configured to predict the chrominance block from a decoded luminance block at a position corresponding to a position of the chrominance block using a linear model calculated from respective luminance and chrominance reference pixels around the chrominance block, wherein
the cross-component linear model predictor is configured to:
identify a luminance intra prediction mode that is an intra prediction mode applied to the intra prediction of the decoded luminance block, and
use the identified luminance intra prediction mode to determine a mode of calculating the linear model for predicting the chrominance block.

2. The intra prediction device according to claim 1, wherein the cross-component linear model predictor includes a reference pixel position selector configured to select, based on the luminance intra prediction mode, the mode indicating linear model calculation pixel positions that are positions of the reference pixels to be used to calculate the linear model.

3. The intra prediction device according to claim 2, wherein the reference pixel position selector is configured to select positions on both upper side and left side of the chrominance block as the linear model calculation pixel positions in response to the luminance intra prediction mode being the intra prediction mode of referring to the reference pixels on both upper side and left side of the luminance block.

4. The intra prediction device according to claim 2, wherein the reference pixel position selector is configured to select positions on an upper side of the chrominance block as the linear model calculation pixel positions in response to the luminance intra prediction mode being the intra prediction mode of referring to the reference pixels on the upper side of the luminance block without referring to the reference pixels on a left side of the luminance block.

5. The intra prediction device according to claim 2, wherein the reference pixel position selector is configured to select the positions on a left side of the chrominance block as the linear model calculation pixel positions in response to the luminance intra prediction mode being the intra prediction mode of referring to the reference pixels on the left side of the luminance block without referring to the reference pixels on an upper side of the luminance block.

6. The intra prediction device according to claim 2, wherein the reference pixel position selector is configured to select the positions of predetermined reference pixels as the linear model calculation pixel positions in response to inter prediction being applied to the decoded luminance block or in response to the luminance block at the position corresponding to the position of the chrominance block being not decoded.

7. An image encoding device comprising the intra prediction device according to claim 1.

8. An image decoding device comprising the intra prediction device according to claim 1.

9. An intra prediction method that predicts, by intra prediction, a luminance block and a chrominance block obtained by dividing an image, the intra prediction method comprising:
predicting the chrominance block from a decoded luminance block at a position corresponding to a position of the chrominance block using a linear model calculated from respective luminance and chrominance reference pixels around the chrominance block, wherein
the predicting includes:
identifying a luminance intra prediction mode that is an intra prediction mode applied to the intra prediction of the decoded luminance block; and
using the identified luminance intra prediction mode to determine a mode of calculating the linear model for predicting the chrominance block.

* * * * *